(12) United States Patent
Morrow

(10) Patent No.: US 6,283,339 B1
(45) Date of Patent: Sep. 4, 2001

(54) TWIST BOTTOM DISPENSER

(75) Inventor: J. Mark Morrow, Camden, SC (US)

(73) Assignee: Sonoco Development, Inc., Hartsville, SC (US)

( * ) Notice: Subject to any disclaimer, the term of this patent is extended or adjusted under 35 U.S.C. 154(b) by 0 days.

(21) Appl. No.: 09/541,012

(22) Filed: Mar. 31, 2000

(51) Int. Cl.[7] .................................................. G01F 11/28
(52) U.S. Cl. .......................... 222/452; 222/426; 222/370; 222/548; 222/482; 222/483; 222/142.9; 222/430
(58) Field of Search ................................. 222/553, 142.9, 222/482, 483, 486, 548, 450, 451, 452, 370, 367, 430, 426

(56) References Cited

U.S. PATENT DOCUMENTS

| | | | |
|---|---|---|---|
| 2,361,047 | * 10/1944 | Morey | 222/553 |
| 2,385,677 | * 9/1945 | Bailey | 222/452 |
| 2,763,409 | * 9/1956 | Stagmeier | 222/541 |
| 2,812,882 | * 11/1957 | Osaka | 222/142.2 |
| 2,877,937 | 3/1959 | Weir . | |
| 2,898,010 | * 8/1959 | Tepper | 222/339 |
| 2,904,230 | 9/1959 | Worth . | |
| 3,201,009 | * 8/1965 | Smith | 222/443 |
| 3,211,334 | 10/1965 | McShea . | |
| 3,258,174 | 6/1966 | Mullen . | |
| 3,414,172 | * 12/1968 | Souza | 222/443 |
| 3,446,403 | 5/1969 | Serio . | |
| 3,450,310 | 6/1969 | Dayton . | |
| 3,695,487 | * 10/1972 | Slayton et al. | 222/430 |
| 3,730,387 | 5/1973 | McConnell et al. . | |
| 4,174,058 | 11/1979 | Bassignani . | |
| 4,288,006 | * 9/1981 | Clover | 222/42 |
| 4,345,700 | 8/1982 | Souza . | |
| 4,380,307 | * 4/1983 | Stillinger | 222/142.9 |
| 4,544,063 | * 10/1985 | Neward | 206/540 |
| 4,583,667 | * 4/1986 | Fishman et al. | 222/142.6 |
| 4,804,101 | * 2/1989 | Heath | 220/20 |
| 4,961,521 | * 10/1990 | Eckman | 222/142.5 |
| 5,495,962 | 3/1996 | Nomura . | |
| 5,588,563 | 12/1996 | Liu . | |
| 5,772,086 | 6/1998 | Krafft . | |

* cited by examiner

Primary Examiner—Joseph A. Kaufman
Assistant Examiner—F. Nicolas
(74) Attorney, Agent, or Firm—Bullwinkel Partners, Ltd

(57) ABSTRACT

A two-part dispenser for attachment to the bottom of a cylindrical container for dispensing a pre-calibrated amount of powdered or granular product from the container by twisting or rotating one part of the dispenser with respect to the container. The dispenser comprises a generally cup-shaped member adapted to engage the bottom of the container in fixed relationship therewith and a chambered member that fits within the cup-shaped member and can be rotated with respect to the cup-shaped member to dispense product.

12 Claims, 3 Drawing Sheets

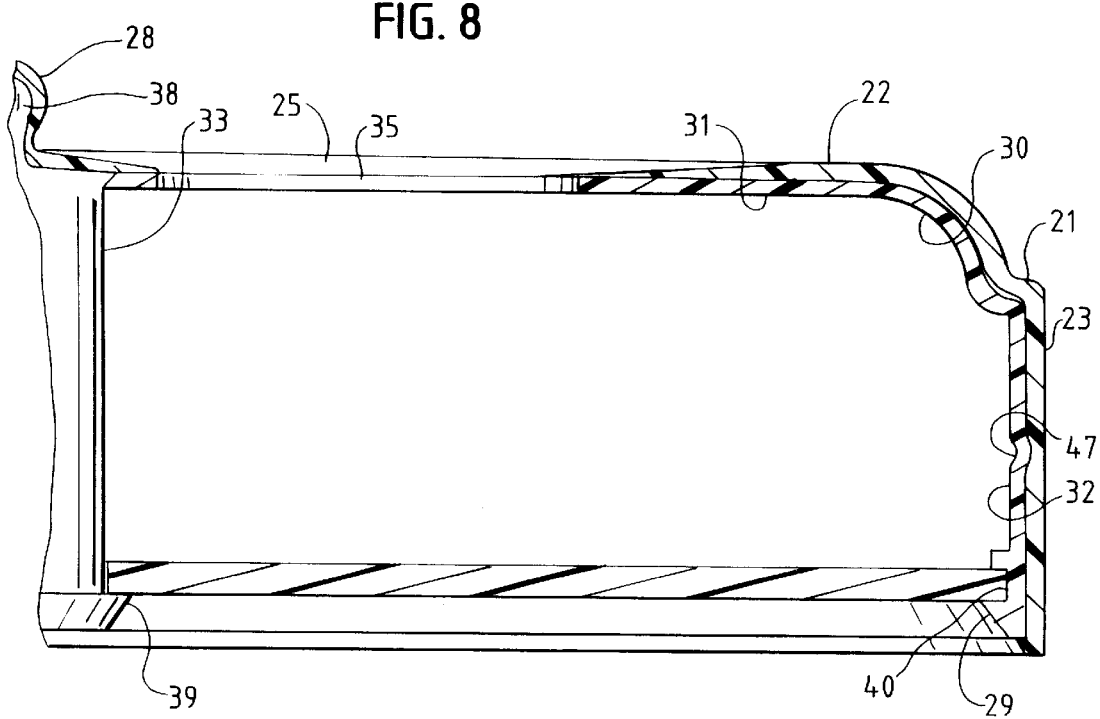

TWIST BOTTOM DISPENSER

BACKGROUND

1. Field of the Invention

This patent relates to a device for dispensing powdered or granular product. More particularly, this patent relates to a two-piece device that can dispense a pre-calibrated amount of powdered or granular product by twisting or rotating one piece with respect to the other piece.

2. Description of the Related Art

Many powdered or granular products are sold in paperboard containers having metal or plastic bottoms and removable metal or plastic lids. Typically the powdered or granular product is removed from the container with a spoon or scoop after the lid has been entirely or partly removed. Many scoops have been designed to hold a predetermined volume of material to allow the consumer to use the proper amount of product. Often the scoop is stored inside the container.

A disadvantage of such containers is that the lid has to be at least partly removed, which exposes the product to ambient air, which can cause the product to deteriorate. While many such containers are equipped with an inner seal to prevent exposure during shipping and handling, the inner seal is removed before the first use and not replaced.

Moreover, removing the lid can cause contaminates to fall into the product from the air. Contaminates can also be introduced into the product from the consumer's fingers while "searching" for the scoop buried under the product.

Another disadvantage of such containers is that product can be spilled while using the scoop to transfer the product from the container to a vessel for use. Multiple transfers, such as might be required when using several teaspoons of product, increase the chances of spillage.

Other containers for products such as salt, pepper or spices usually do not incorporate any means of dispensing a premeasured amount of the product. Instead, the product is usually poured, sifted or removed with a spoon. In each case a secondary device must be used to measure the desired amount. Again, transferring the product can cause spillage.

Thus it is an object of the present invention to provide a device that can dispense a pre-calibrated amount of powdered or granular product from a container by twisting or rotating one part of the device with respect to the container.

Another object of the invention is to provide a container for dispensing product in which the lid need not be removed.

Yet another object of the invention is to provide a dispensing container that does not require a scoop or other measuring device to remove product.

Still another object of the invention is to provide a dispensing device that attaches to the bottom of a container.

Still another object of the invention is to provide a dispensing device for a container that dispenses product without inverting the container.

Further and additional objects will appear from the description, accompanying drawings, and appended claims.

SUMMARY OF THE INVENTION

The present invention is a two-part dispenser for use with an open bottom container for dispensing a precalibrated amount of powdered or granular product from the container by twisting or rotating one part of the dispenser with respect to the part of the dispenser fixedly attached to the container. The dispenser comprises a generally cup-shaped member adapted to engage the bottom of the container in fixed relationship therewith and a chambered member that fits within the cup-shaped member and can be rotated with respect to the cup-shaped member to dispense product.

The cup-shaped member is so-named because it resembles an inverted cup, having a substantially planar top and a sidewall extending downward from the periphery of the planar top. The planar top becomes the bottom of the container when the cup-shaped member is installed. The cup-shaped member has one dispensing opening located in the sidewall and a number of fill openings located in the planar top, the number of fill openings corresponding to the number of chambers located in the chambered member.

The chambered member has a top, a bottom and a sidewall connecting the top and bottom, all of which define a cavity. Preferably the cavity is divided into at least two chambers by internal walls, each chamber having a defined volume, such as a teaspoon or tablespoon. Each chamber has a fill opening in the chambered member top corresponding to an opening in the cup-shaped member such that when the chambered member fill openings are aligned with the cup-shaped member fill openings product is transferred from the container to the chambers.

Each chamber also has an outlet opening in the chambered member sidewall. The chamber outlet openings are arranged such that when any one chamber outlet opening is aligned with the cup-shaped member outlet opening the fill openings are not aligned. This arrangement allows for the controlled dispensing of powdered product located in the desired chamber. Preferably, the chambered member has a recessed handle integrally formed with the chambered member bottom for easy rotation of the chambered member.

THE DRAWINGS

FIG. 8 is a vertical cutaway view of an alternative embodiment of the twist bottom dispenser.

DETAILED DESCRIPTION OF THE INVENTION

Figure 1:
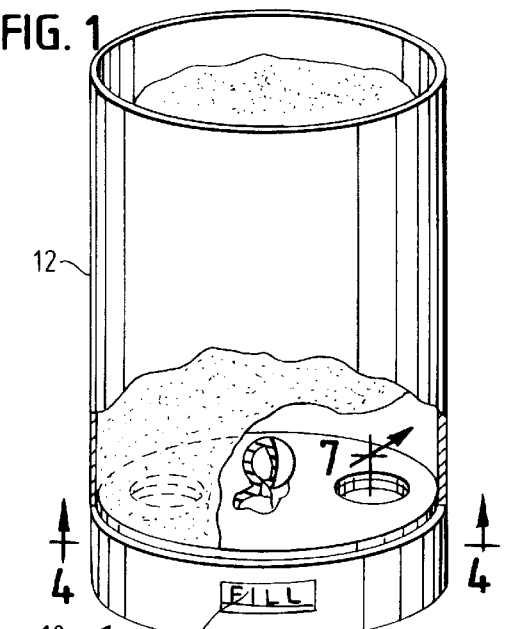
FIG. 1 is a cutaway perspective view of a twist bottom dispenser according to the present invention attached to a cylindrical container, the dispenser shown in the FILL position.

Turning to the drawings, there is shown in FIG. 1 one embodiment of the present invention, a two-part molded plastic twist bottom dispenser 10 for use with an open bottom cylindrical container body 12. The dispensing bottom 10 is attached to the container body 12 by friction fit, adhesive or any other suitable means.

The dispensing bottom 10 has two parts, a cup-shaped member 20 and a chambered member 30. The cup-shaped member 20 and the chambered member 30 form a snap fit with each other. The cup-shaped member 20 is affixed to the container body 12 and is held stationary with respect to the container body 12. The chambered member 30 is rotatable relative to the cup-shaped member 20, preferably with the aid of a recessed handle 46 (FIGS. 3–6) integrally formed with the chambered member 30.

The cup-shaped member 20 has a substantially planar top 22 and a peripheral skirt or sidewall 23 extending downward therefrom. The planar top 22 serves as the bottom of the container and has at least one hole (preferably two) disposed therein to allow product to flow into the chambered member 30 when the hole is aligned with a corresponding hole in the chambered member 30. In the illustrated embodiment, the cup-shaped member 20 has two fill holes 24, 25 which, when the twist bottom dispenser is in the FILL position (FIG. 4) align with corresponding fill holes 34, 35 in the chambered member 30.

The cup-shaped member 20 also has a single side opening 26 disposed in its sidewall 23. As explained below, this side opening 26 allows product to be dispensed when the opening 26 is aligned with one of the side openings in the chambered member 30.

Figure 7:
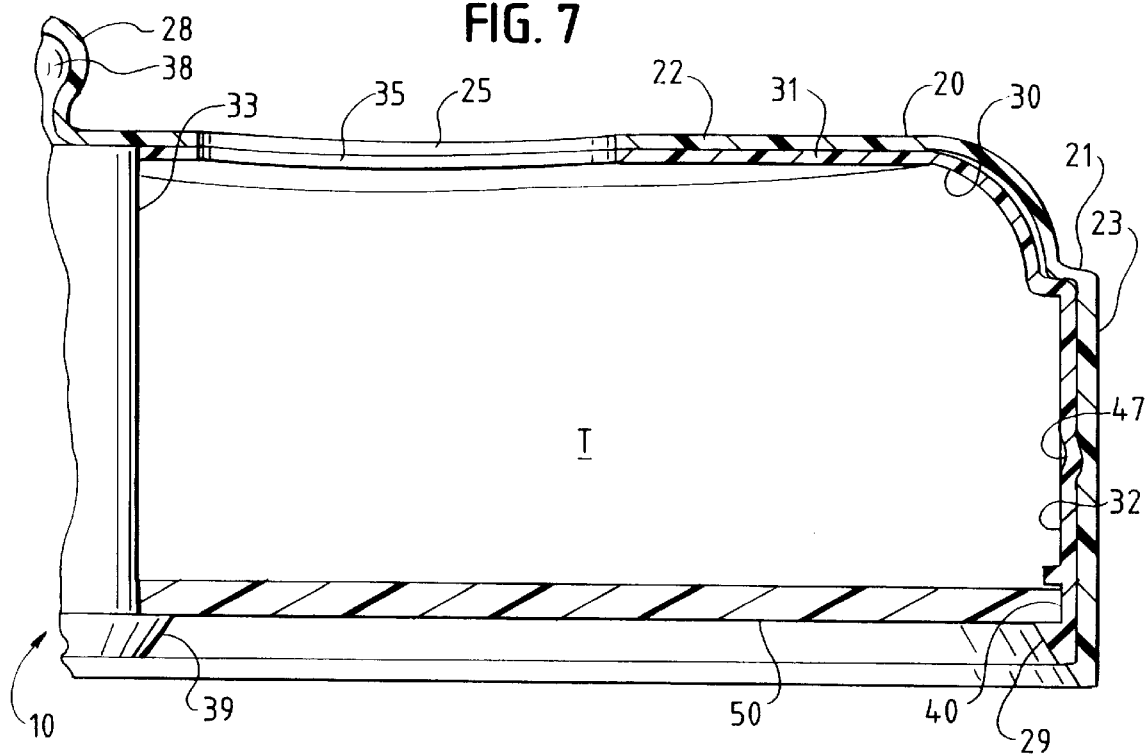
FIG. 7 is a vertical cutaway view taken along line 7—7 of FIG. 1.

As best seen in FIG. 7, the cup-shaped member 20 also has a ridge 29 formed around the lower periphery of the sidewall 23 on the inside (the side toward the chambered member 30). The diameter of the circular opening defined by the ridge 29 is slightly smaller than the outside diameter of the chambered member sidewall 32. However, the cup-shaped member sidewall 23 is sufficiently resilient so that when the chambered member 30 is inserted inside the cup-shaped member 20 the sidewall expands to accommodate the larger-diameter chambered member 30, then contracts to its original shape, thereby holding the chambered member 30 inside the cup-shaped member, as shown in FIG. 7.

Figure 2:
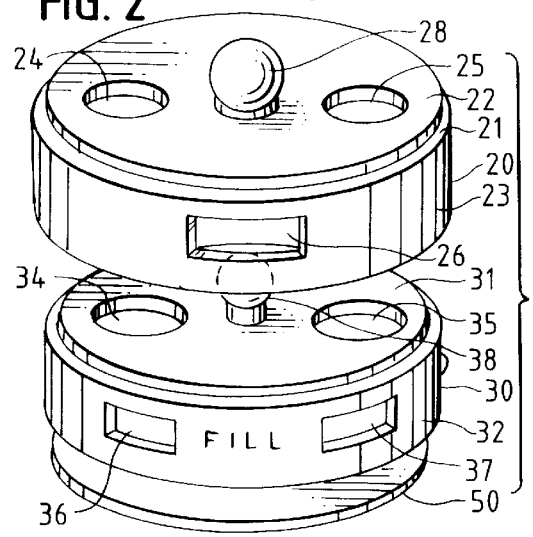
FIG. 2 is a top perspective exploded view of the twist bottom dispenser of FIG. 1.
Figure 3:
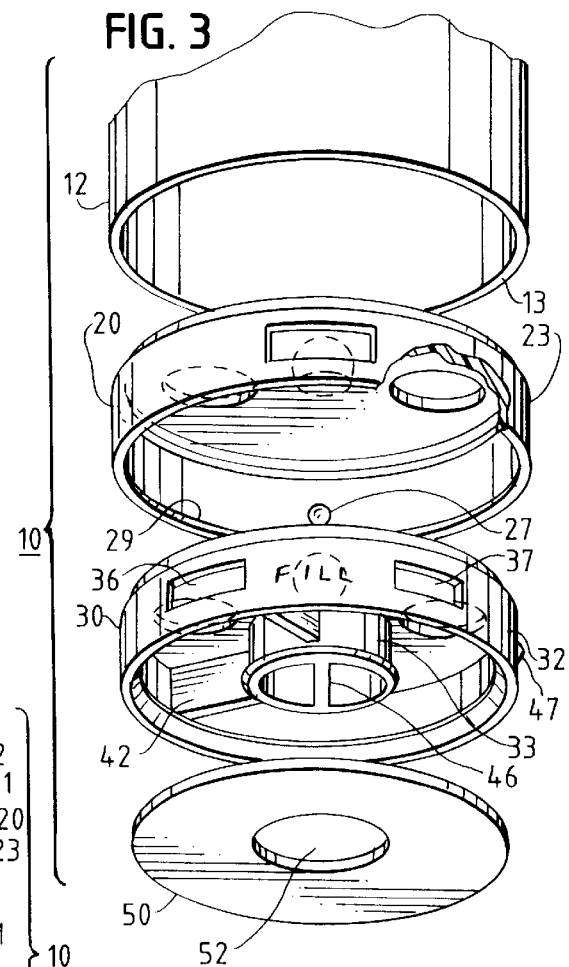
FIG. 3 is a bottom perspective exploded view of the twist bottom dispenser and container of FIG. 1.
Figure 4:
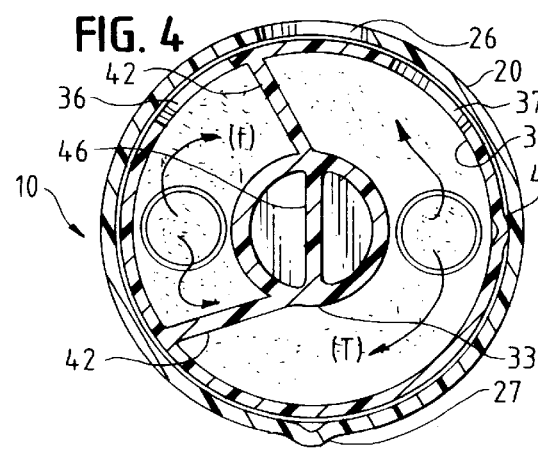
FIG. 4 is a horizontal cutaway view taken along line 4—4 of FIG. 1 showing the dispenser in the FILL position.
Figure 5:
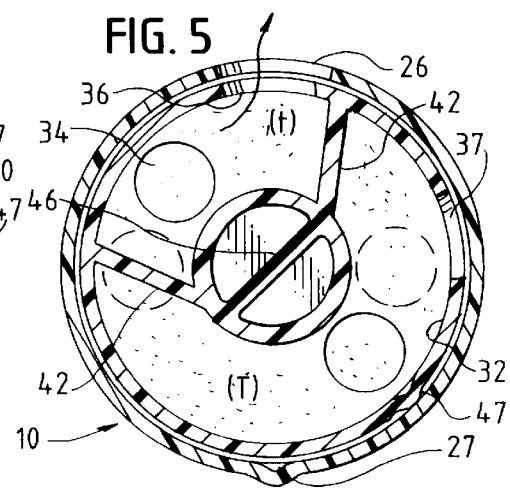
FIG. 5 is a horizontal cutaway view of the twist bottom dispenser of FIG. 1 shown in the DISPENSING position.

The cup-shaped member 20 also has an optional hollow rivet housing 28 mounted at the center of the planar top 22 and preferably formed integrally therewith (FIGS. 2 and 7). In the assembled dispenser 10 an optional rivet 38 mounted on top of the chambered member 30 snaps inside the rivet housing 28 to help hold the two components together in rotatable fashion.

The outer diameter of the cup-shaped member sidewall 23 is approximately the same as the outer diameter of the container body 12 so as to provide the container assembly with a smooth outer contour. The cup-shaped member planar top 22, however, has a diameter approximating that of the inner diameter of the container body 12 so that the planar top 22 fits snugly inside the container body 12. The top of the sidewall 23 forms an annular shoulder 21 which engages the bottom rim 13 of the container body in the assembled container.

The cup shaped member 20 may be affixed to the container body 12 in a number of ways. For example, adhesive may be used to affix the shoulder 21 to the container body rim 13 (and to affix the periphery of the planar top 22 to the container body 12). Alternatively or in addition to the adhesive, the twist bottom dispenser 10 and container body 12 may be held together with a friction fit. In another embodiment, the cup shaped member 20 is made of heat sealable plastic such as high density polyethylene (HDPE) and the container body 12 is coated or lined with HDPE. The cup shaped member 20 may then be heat sealed to the container body coating or liner at the shoulder 21 and/or the periphery of the planar top 22.

The chambered member 30 has a substantially planar top 31, a peripheral sidewall 32 extending downward from the planar top 31, and a central cylindrical hub 33 extending downward from the center of the planar top 31. A groove 40 located near the bottom of the sidewall 32 on the inside accommodates a circular disk 50 in snap fit fashion which serves as the bottom of the chambered member 30.

The hub 33 has a resilient outwardly extending annular ridge 39 near its base (FIG. 7) which helps hold the circular disk 50 in place. The circular disk 50 has a central opening 52 (FIG. 3) which allows the disk 50 to snap over the hub ridge 39 and fit snugly around the central hub 33.

The chambered member top 31, sidewall 32 and bottom disk 50 together define a cavity. A plurality of interior walls 42 extending radially from the central hub 33 to the sidewall 32 divide the cavity into two or more chambers or compartments having predetermined volumes. For example, in the illustrated embodiment chamber (T) has a volume equivalent to a tablespoon and chamber (t) has a volume equivalent to a teaspoon.

As already explained, the chambered member 30 has a hole located in the planar top 31 over each chamber and an opening located along that part of the sidewall 32 defining each chamber. Thus, the teaspoon chamber (t) has a hole 34 located above the chamber (t) and an opening 36 located in the sidewall forming part of the teaspoon chamber (t), and the tablespoon chamber (T) has a hole 35 on top and an opening 37 in the sidewall forming part of the tablespoon chamber (T). As will be explained, the side openings are used to dispense product.

The twist bottom dispenser 10 may be assembled by first snapping into place the circular disk 50 into the groove 40 to create the chambered member 30. Next, the chambered member 30 may be inserted into the cup-shaped member 20 until the chambered member 30 is locked in place by the ridge 29 on the cup-shaped member 20 and the chambered member center rivet 38 is forced inside the rivet housing 28 on top of the chambered member 30. When the chambered member 30 is fully inserted into the cup-shaped member 20 the tops of each are in abutting relationship. Finally, the assembled dispenser may be affixed to the container cylindrical body 12. An optional piece of recloseable tape or other cover means (not shown) with barrier properties to air and moisture may be placed over the dispenser sidewall opening 26.

The twist bottom dispenser 10 may be used in the following manner. First, the user twists or rotates the chambered member 30 with respect to the cup-shaped member 20 until the holes above the chambers are aligned with the corresponding holes in the cup-shaped member 20. This is typically accomplished by grasping the container body 12 with one hand and turning the chambered member 30 with the other hand using the recessed handle 46 until some indicia, such as the word FILL, appears in side opening 26 of the cup-shaped member 20. This allows product to flow into the chambers.

Next, the user further rotates the chambered member 30 until the appropriate sidewall opening in the chambered member 30 and the sidewall opening 26 in the cup-shaped member 20 align. By tilting the container so that the aligned side openings are facing downward the desired amount of product can be dispensed. Thus the consumer can hold the container directly over a cooking container or a plate, turn the handle or otherwise rotate the chambered member 30 once to fill and a second time to dispense a premeasured amount of product without the need for measuring spoons or other external means of measurement.

For example, beginning with the twist bottom dispenser 10 in the closed position (FIG. 6), a teaspoon of product can be dispensed by turning the chambered member approximately 90 degrees counterclockwise (as viewed from below) until the fill holes are aligned (FIG. 4), then turning the chambered member 30 approximately 30–45 degrees clockwise until the side opening 36 in the teaspoon chamber (t) is aligned with the side opening 26 in the cup-shaped member (FIG. 5) and tilting the container until product is dispensed.

Figure 6:
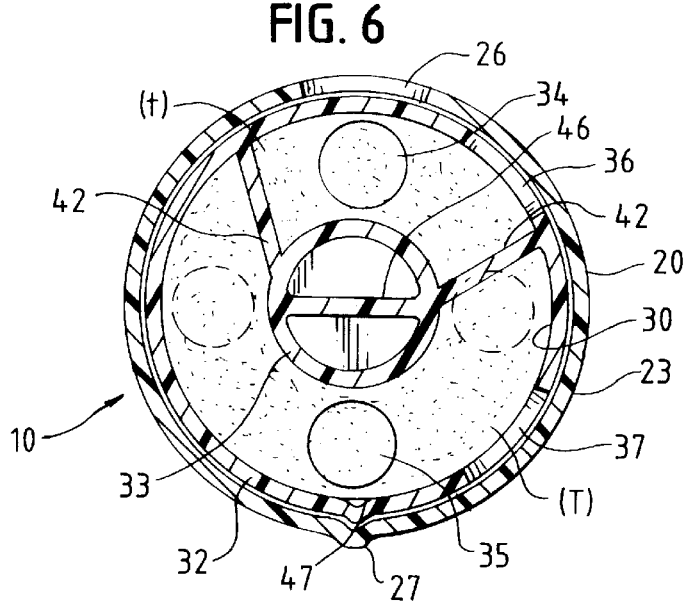
FIG. 6 is a horizontal cutaway view of the twist bottom dispenser of FIG. 1 shown in the CLOSED position.

Likewise, beginning at the closed position shown in FIG. 6, a tablespoon of product can be dispensed by 25 rotating the chambered member 30 clockwise approximately 90 degrees until the fill holes align, then further clockwise approximately 135 degrees until the side opening in the tablespoon chamber is aligned with the side opening in the cup-shaped member (not shown). Significantly, when product is filling the chambers, neither of the openings 36, 37 in the sidewall of the chambered member is aligned with the opening 26 in the sidewall of the cup-shaped member, thus preventing product from spilling inadvertently.

Having the dispensing openings 36, 37 in the chambered member sidewall 32 instead of the bottom is a key aspect of the invention because it eliminates the need for a third structural member to block the dispensing openings during the fill step.

An optional feature is the placement of a detent 27 on the cup-shaped member sidewall 23 and a second corresponding detent 47 on the chambered member sidewall 32. When the twist bottom dispenser 10 is in the closed position (FIG. 6) the detentes fit together to prevent accidental turning of the chambered member 30 and thus accidental spilling of product.

In another optional modification the fill holes 24, 25 located on the cup-shaped member are configured such that only one fill hole at a time is aligned with a fill hole in the chambered member. In this configuration, only one chamber is filled at a time.

In another anticipated modification the cup-shaped member 20 has only one fill hole, and thus product can fill only one chamber at a time.

In still another anticipated modification the chambered member has three or more chambers, each having a distinct volume. The cup-shaped member may have one or more fill holes.

In still another modification of the present invention the chambered member has only a single chamber having a predetermined volume. In this embodiment there is only one set of fill holes and one set of sidewall openings. The sidewall openings and the fill holes do not both align at the same time.

In yet another modification, shown in FIG. 8, portions of the substantially planar top 22 of the cup-shaped member 20 are downwardly sloped toward the fill holes 25 so that product is guided to the holes. This modification is intended to make it easier to dispense product when the container is almost empty.

Other modifications and alternative embodiments of the invention are contemplated which do not depart from the spirit and scope of the invention as defined by the foregoing teachings and appended claims. It is intended that the claims cover all such modifications that fall within their scope.

I claim as my invention:

1. A dispensing container comprising:
   a cylindrical container body having an open bottom end;
   a cup-shaped member fixedly attached to the open bottom end of the cylindrical container body, said cup-shaped member having a substantially planar top with at least one hole disposed therein and a peripheral sidewall extending downward from the substantially planar top, the sidewall having an opening disposed therein; and
   a chambered member rotatably attached to the cup-shaped member, said chambered member having a substantially planar top abutting the substantially planar top of the cup-shaped member, a hole disposed in the substantially planar top, a peripheral sidewall extending downward from the planar top, the sidewall having an opening disposed therein, and a bottom disk affixed to the chambered member sidewall, the chambered member top, sidewall and bottom disk defining a cavity;
   wherein rotating the chambered member with respect to the cup-shaped member until the hole in the chambered member aligns with the hole in the cup-shaped member causes product within the container body to enter the cavity when the container is substantially upright, and further rotating of the chambered member until the sidewall opening in the chambered member aligns with the side wall opening in the cup-shaped member causes product in the cavity to be dispensed.

2. The dispensing container of claim 1 wherein when the chambered member hole is aligned with the cup-shaped member hole, the chambered member sidewall opening is not aligned with the cup-shaped member sidewall opening, thereby preventing inadvertent dispensing of product when product is entering the cavity.

3. The dispensing container of claim 1 wherein a portion of the cup-shaped member substantially planar top is sloped downwardly toward the at least one cup-shaped member hole so that product is directed toward the hole.

4. A dispensing container comprising:
   a cylindrical container body having an open bottom end;
   a cup-shaped member fixedly attached to the open bottom end of the cylindrical container body, said cup-shaped member having a substantially planar top with two holes disposed therein and a peripheral sidewall extending downward from the substantially planar top, the sidewall having an opening disposed therein; and
   a chambered member rotatably attached to the cup-shaped member, said chambered member having a substantially planar top abutting the substantially planar top of the cup-shaped member, a peripheral sidewall extending downward from the planar top, a bottom disk affixed to the chambered member sidewall, the chambered member top, sidewall and bottom disk defining a cavity, said chambered member further comprising interior walls dividing the cavity into two chambers having predetermined volumes, said chambered member further comprising a hole disposed in the planar top above each chamber and an opening disposed in a portion of the sidewall corresponding to each chamber;
   wherein a desired volume of product can be dispensed by rotating the chambered member until the hole above the chamber having the desired predetermined volume is aligned with a hole in the cup-shaped member planar top, thereby allowing product within the container body to enter the chamber, then further rotating the chambered member until the opening in the sidewall of the chamber having the desired predetermined volume is aligned with the opening in the cup-shaped member, thereby causing the product in the chamber to be dispensed.

5. The dispensing container of claim 4 further comprising means for rotating the chambered member.

6. The dispensing container of claim 4 wherein the cup-shaped member further comprises a ridge formed around the cup-shaped member sidewall to hold the chambered member within the cup-shaped member.

7. The dispensing container of claim 4 wherein the cup-shaped member further comprises a hollow rivet housing mounted at the center of the cup-shaped member planar top to receive and engage a rivet mounted at the center of the planar top of the chambered member.

8. The dispensing container of claim 4 wherein the cup-shaped member is affixed to the container body with glue.

9. The dispensing container of claim 4 further comprising indicia located on the chambered member sidewall such that, when said indicia appears through the cup-shaped member sidewall opening, the holes disposed in the cup-shaped member top are aligned with the holes in the chambered member top.

10. The dispensing container of claim 4 further comprising indicia located on the chambered member sidewall such that, when said indicia appears through the cup-shaped member sidewall opening, only one of the two holes disposed in the cup-shaped member top is aligned with a hole in the chambered member top.

11. The dispensing container of claim 4 further comprising a detent formed in the cup-shaped member sidewall and a detent formed in the chambered member sidewall, said detentes configured to fit together to hold the cup-shaped member relative to the chambered member when the cup-shaped member sidewall opening is not aligned with either chambered member sidewall opening.

12. The dispensing container of claim 5 wherein said rotating means is a recessed handle integrally formed with the chambered member.

* * * * *